(12) United States Patent
Boss et al.

(10) Patent No.: US 8,738,276 B1
(45) Date of Patent: May 27, 2014

(54) EMERGENCY ROUTING WITHIN A CONTROLLABLE TRANSIT SYSTEM

(71) Applicant: International Business Machines Corporation, Armonk, NY (US)

(72) Inventors: Gregory J. Boss, Midland, MI (US); Christopher J. Dawson, Arlington, VA (US); Rick A. Hamilton, Charlottesville, VA (US); Benjamin G. Morris, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/768,661

(22) Filed: Feb. 15, 2013

Related U.S. Application Data

(63) Continuation of application No. 12/767,869, filed on Apr. 27, 2010, now Pat. No. 8,406,986.

(51) Int. Cl.
*G08G 1/005* (2006.01)
*G08G 1/127* (2006.01)

(52) U.S. Cl.
USPC .............. 701/117; 455/404.1; 455/404.2; 701/515; 701/118

(58) Field of Classification Search
USPC .................... 701/117; 455/404.1, 404.2
See application file for complete search history.

(56) References Cited

U.S. PATENT DOCUMENTS

| | | | |
|---|---|---|---|
| 5,122,959 A * | 6/1992 | Nathanson et al. | 701/117 |
| 5,335,180 A * | 8/1994 | Takahashi et al. | 701/117 |
| 6,129,025 A * | 10/2000 | Minakami et al. | 104/88.01 |
| 6,427,114 B1 * | 7/2002 | Olsson | 701/117 |
| 6,611,750 B2 | 8/2003 | MacPhail et al. | |
| 6,668,729 B1 | 12/2003 | Richards | |
| 6,681,175 B2 | 1/2004 | MacPhail et al. | |
| 6,958,707 B1 | 10/2005 | Siegel | |
| 7,134,088 B2 | 11/2006 | Larsen | |
| 7,395,151 B2 * | 7/2008 | O'Neill et al. | 701/411 |
| 7,571,179 B2 | 8/2009 | Meyers et al. | |
| 7,634,361 B2 * | 12/2009 | Levesque et al. | 702/19 |
| 7,936,286 B2 * | 5/2011 | Adair | 340/995.12 |
| 8,150,611 B2 * | 4/2012 | Mukherjee | 701/118 |
| 8,406,986 B2 * | 3/2013 | Boss et al. | 701/117 |
| 8,493,230 B2 * | 7/2013 | Hikita et al. | 340/815.4 |
| 2005/0137754 A1 | 6/2005 | Bartlett | |
| 2005/0267651 A1 * | 12/2005 | Arango et al. | 701/3 |

(Continued)

OTHER PUBLICATIONS

Hussein A. El Chanti, USPTO Office Action, U.S. Appl. No. 12/767,869, Mail Date Sep. 7, 2012, 8 pages.

(Continued)

*Primary Examiner* — Khoi Tran
*Assistant Examiner* — Ryan Rink
(74) *Attorney, Agent, or Firm* — William E. Schiesser; Keohane & D Alessandro, PLLC

(57) ABSTRACT

Embodiments of the present invention provide a solution for an orderly and well-considered evacuation of a Personal Rapid Transit (PRT) system in the event of declared emergency. It describes the mapping of evacuation points and subsequent routing of PRT vehicles according to both the nature/location of the emergency and outflow capacity at each evacuation point. If an emergency is declared within a PRT system, which does not cause widespread power loss, but which does require an orderly evacuation (e.g., smoke or flooding), PRT vehicles will be routed to an evacuation point capable of handling such outflow in an orderly manner.

17 Claims, 5 Drawing Sheets

(56) References Cited

U.S. PATENT DOCUMENTS

| | | |
|---|---|---|
| 2007/0198168 A1* | 8/2007 | Nathan et al. .................. 701/117 |
| 2007/0210910 A1 | 9/2007 | Norstrum et al. |
| 2008/0004790 A1* | 1/2008 | Ames ............................. 701/117 |
| 2008/0046134 A1 | 2/2008 | Bruce et al. |
| 2008/0195257 A1 | 8/2008 | Rauch |
| 2008/0319805 A1* | 12/2008 | Burke, Jr. ........................... 705/5 |
| 2009/0018875 A1* | 1/2009 | Monatesti et al. ................. 705/7 |
| 2009/0261972 A1 | 10/2009 | Adair |
| 2010/0106395 A1* | 4/2010 | Gadler ........................... 701/117 |
| 2010/0161370 A1* | 6/2010 | Bloom ............................... 705/9 |
| 2011/0128159 A1* | 6/2011 | Hikita et al. ................. 340/815.4 |
| 2012/0211606 A1* | 8/2012 | Cornell et al. ............... 244/137.2 |
| 2012/0267202 A1* | 10/2012 | Siikonen ......................... 187/384 |

OTHER PUBLICATIONS

Hussein A. El Chanti, USPTO Notice of Allowance and Fee(s) Due, U.S. Appl. No. 12/767,869, Mail Date Nov. 16, 2012, 7 pages.

* cited by examiner

EMERGENCY ROUTING WITHIN A CONTROLLABLE TRANSIT SYSTEM

RELATED U.S. APPLICATION DATA

The present patent document is a continuation of U.S. patent application Ser. No. 12/767,869, filed Apr. 27, 2010, entitled "EMERGENCY ROUTING WITHIN A CONTROLLABLE TRANSIT SYSTEM", the disclosure of which is incorporated herein by reference.

TECHNICAL FIELD

The present invention generally relates to transit systems (e.g., Personal Rapid Transit (PRT) systems). Specifically, the present invention relates to routing of vehicles within a controllable transit system in response to an emergency.

BACKGROUND

As energy conservation becomes an increasingly important goal, one area of needed improvement is traffic and/or transportation management. Today, a traveler's options are typically limited to either an individual mode of transportation (e.g., an automobile), or mass transit (e.g., airplanes, subways, buses, trains, etc.). Neither option is entirely efficient. As a result, the more recent concept of "Personal Rapid Transit" (PRT) has an emergency. Still in its infancy, PRT is a public transportation concept that offers on-demand, non-stop transportation using small, automated vehicles on a network of specially-built guide-ways. Unfortunately, several issues stand in the way of efficient management of PRT systems.

SUMMARY

Embodiments of the present invention provide a solution for an orderly and well-considered evacuation of a Personal Rapid Transit (PRT) system in the event of declared emergency. It describes the mapping of evacuation points and subsequent routing of PRT vehicles according to both the nature/location of the emergency and outflow capacity at each evacuation point. A PRT is defined as an automatic method by which personal transport vehicles (a/k/a "pods") can be used to efficiently and rapidly move people between various points within a closed area (for example, a city center). In an ideal world, these pods can be thought of as intelligent automated vehicles (similar to driverless taxis) that can adapt to changing demand to optimize the movement of people. For example, an emergency may be declared within a PRT system which does not cause widespread power loss, but which does require an orderly evacuation (e.g., smoke or flooding). In such events, PRT vehicles will be routed through the means described herein to an evacuation point capable of handling such outflow in an orderly manner.

A first aspect of the present invention provides a method for emergency routing within a controllable transit system, comprising: identifying an emergency affecting the controllable transit system; evaluating a set of evacuation points within the controllable transit system based on the emergency; classifying a set of vehicles of the controllable transit system as impacted or not impacted by the emergency; and determining a set of routes for the vehicles to reach the set of evacuation points, the set of routes being determined based on the evaluating and the classifying.

A second aspect of the present invention provides a system for emergency routing within a controllable transit system, comprising: a memory medium comprising instructions; a bus coupled to the memory medium; a processor coupled to the bus that when executing the instructions causes the system to: identify an emergency affecting the controllable transit system; evaluate a set of evacuation points within the controllable transit system based on the emergency; classify a set of vehicles of the controllable transit system as impacted or not impacted by the emergency; and determine a set of routes for the vehicles to reach the set of evacuation points, the set of routes being determined based on the evaluation and the classification.

A third aspect of the present invention provides a computer readable medium containing a program product for emergency routing within a controllable transit system, the computer readable medium comprising program code for causing a computer to: identify an emergency affecting the controllable transit program product; evaluate a set of evacuation points within the controllable transit program product based on the emergency; classify a set of vehicles of the controllable transit system as impacted or not impacted by the emergency; and determine a set of routes for the vehicles to reach the set of evacuation points, the set of routes being determined based on the evaluation and the classification.

A fourth aspect of the present invention provides a method for deploying a system for emergency routing within a controllable transit system, comprising: providing a computer infrastructure being operable to: identify an emergency affecting the controllable transit program product; evaluate a set of evacuation points within the controllable transit program product based on the emergency; classify a set of vehicles of the controllable transit system as impacted or not impacted by the emergency; and determine a set of routes for the vehicles to reach the set of evacuation points, the set of routes being determined based on the evaluation and the classification.

BRIEF DESCRIPTION OF THE DRAWINGS

These and other features of this invention will be more readily understood from the following detailed description of the various aspects of the invention taken in conjunction with the accompanying drawings in which.

Figure 1:
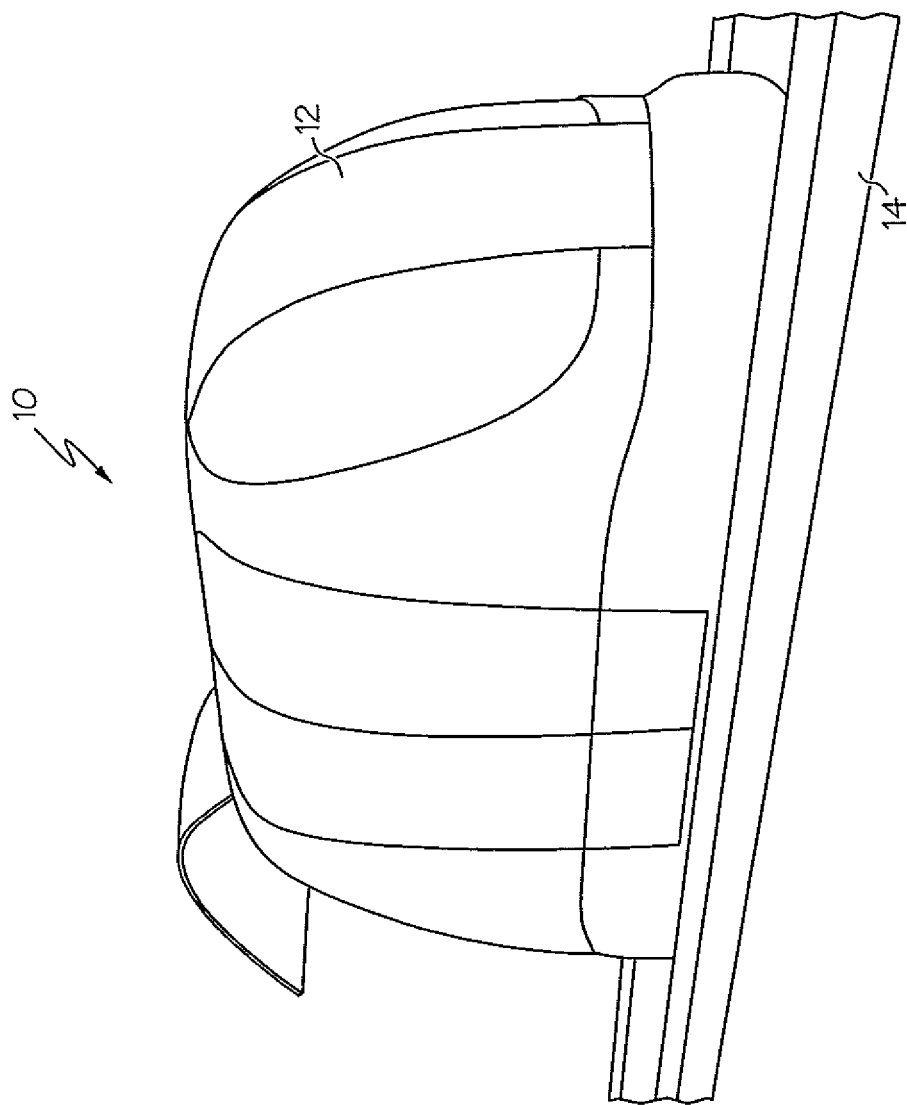
FIG. 1 shows an illustrative vehicle for a controllable transit system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description of the invention has the following sections:

I. General Description
II. Computerized Implementation

I. General Description

Referring to FIG. 1, embodiments of the present invention provide a solution for an orderly and well-considered evacuation of a Personal Rapid Transit (PRT) system 10 in the event of declared emergency. It describes the mapping of evacuation points, and subsequent routing of PRT vehicles 12 (e.g., along a rail or track system 14, or the like) according to both the nature/location of the emergency and outflow capacity at each evacuation point. A PRT is defined as an automatic method by which personal transport vehicles (a/k/a "pods") can be used to efficiently and rapidly move people between various points within a closed area (for example, a city center). In an ideal world, these pods can be thought of as intelligent automated vehicles (similar to driverless taxis) that can adapt to changing demand to optimize the movement of people. For example, an emergency may be declared within a PRT system which does not cause widespread power loss, but which does require an orderly evacuation (e.g., smoke or flooding). In such events, PRT vehicles will be routed through the means described herein to an evacuation point capable of handling such outflow in an orderly manner.

Specifically, under embodiments of the present invention, evacuation points may be predefined within a PRT system. Upon declared emergency, those potential evacuation points are assessed to be either valid or invalid evacuation points. PRT vehicles are then routed to valid evacuation points according to expected outflow (e.g., quickest time out of the PRT system). This may or may not indicate routing to the closest evacuation point; rather, a close—but not closest—point may be indicated based upon the number of vehicles being routed to the closest point. Segregation of "clean" and 'impacted vehicles upon an evacuation, a segregation of "clean" and "impacted" vehicles may optionally be made. For example, in a case where passengers are impacted (e.g., chemical spill), the vehicle needs to move out of the impacted zone, but may not just want to go to the most expedient evacuation point if that evacuation point is also to be used by emergency services vehicles.

Each evacuation point may have different services and capabilities that impact whether it should be used as an evacuation point. Vehicles classes as "clean" (for example emergency vehicles, law enforcement, etc) may require that an evacuation point has extra capabilities—such as being at street level, close to a water supply, in an open space, etcetera. Based on this determination, "impacted" vehicles may be routed to another evacuation point. Based on whether a vehicle is classed as "clean" or "impacted" and the nature of the evacuation, evacuation points may be separated in that "clean" vehicles go to one evacuation set of points, where "impacted" vehicles go to another. This separation may optimize or prioritize the "impacted" vehicles to the nearest evacuation points first or to evacuation points that have the necessary services and capabilities. For example, if a chemical exposure has occurred and 20% of vehicles are affected, these 20 vehicles may be quarantined to the evacuation points that allow good access to emergency services and services to perform a chemical wash.

Empty vehicles that are also classed as "clean"—meaning that they do not need to be prioritized to find an evacuation point, may be used as 'sensors' or other method to aid in the evacuation. For example, if vehicles include cameras or other sensors, they may be instructed to move to the perimeter of the evacuation zone (without impacted exiting traffic flow) where they can be used to monitor traffic and other local data. Empty or other "clean" vehicles may also play a part in the evacuation by helping people or disabled other vehicles from evacuating. Assuming that automated controls are in place, empty vehicles may be used to tow, transfer passengers, or transport medical or other supply equipment to and from the evacuation zone.

One embodiment of the present invention also provides for a maximum capacity algorithm. Specifically, some vehicles may be able to transport multiple passengers, but perhaps usually do not. Consider regular taxis that can usually hold up to four passengers but often only contain one. In an emergency, each vehicle exiting the evacuation area which contains less than the maximum number of passengers may optionally be rerouted so that extra passengers are picked up, if applicable and necessary. In another embodiment, this algorithm could be used to reduce the number of vehicles exiting the evacuation zone with affected passengers.

Much the same as an HOV lane reduces the amount of traffic, two PRT vehicles co-located in the same area with 50% capacity of passengers may elect to stop next to each other for enough time that only one vehicle needs to evacuate, whereas the other vehicle can be used as a "clean" vehicle. This idea may also be expanded to include a hierarchy of vehicles based on their capacity to transport passengers. For example, if the PRT includes two-person, four-person and eight-person vehicles, it may be necessary to set up "automated shuttles" to evacuation points using exclusively the eight-person vehicles. This would leave the two- and four-passenger vehicles to concentrate on picking up individual passengers from multiple locations around the evacuation area.

Under embodiments of the present invention, the time taken to quickly pick up a small number of people is cross-referenced to the time taken to take a full vehicle (of perhaps eight people) from an area mid-point between the core of the emergency to the evacuation points. Based on this calculation, the midpoint transfer may be changed to minimize the time that any vehicle is waiting for a load. This algorithm also supports the ability to lock down evacuations in the event that the evacuation is based upon a malicious emergency case. In this example, vehicles may be classed as "clean" or "impacted" based on whether there are any suspect passengers within the vehicle. In this case, the "clean" vehicles may be moved to evacuation areas whereas the "impacted" vehicles are either made stationary or moved to a central point OR moved to a specific evacuation point that has the services necessary to process suspects/witnesses.

Figure 2:
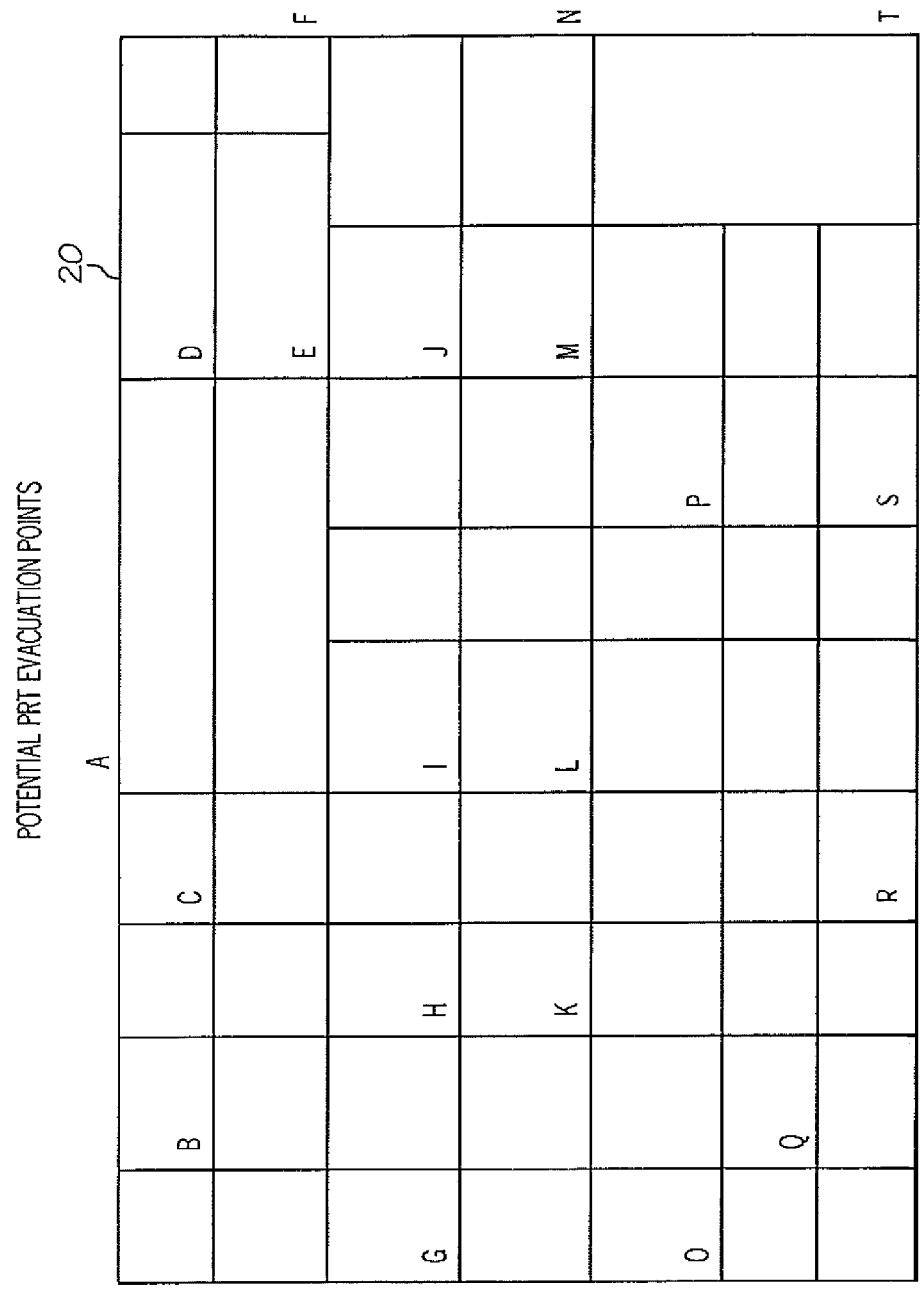
FIG. 2 shows an illustrative evacuation point map according to an embodiment of the present invention.

These concepts are further described within the context of the following example:

(1) Under steady-state operating conditions, a set of potential evacuation points are derived and evaluated. These represent locations where users may exit the PRT system in the event of emergency, such as fire, water, or other extraordinary incident (e.g., detection of hazardous gasses, etc.). Ideally, outflow capacities are associated with each of these points (i.e., how many vehicles may be off-loaded per unit time at each point). Such points are indicated by letter designations in FIG. 2. As can be seen, embodiments of the present invention allow a map 20 to be generated with evacuation points identified thereon. Such points can be identified using a technique such as alpha or numerical references such as those shown in FIG. 2.

Figure 3:
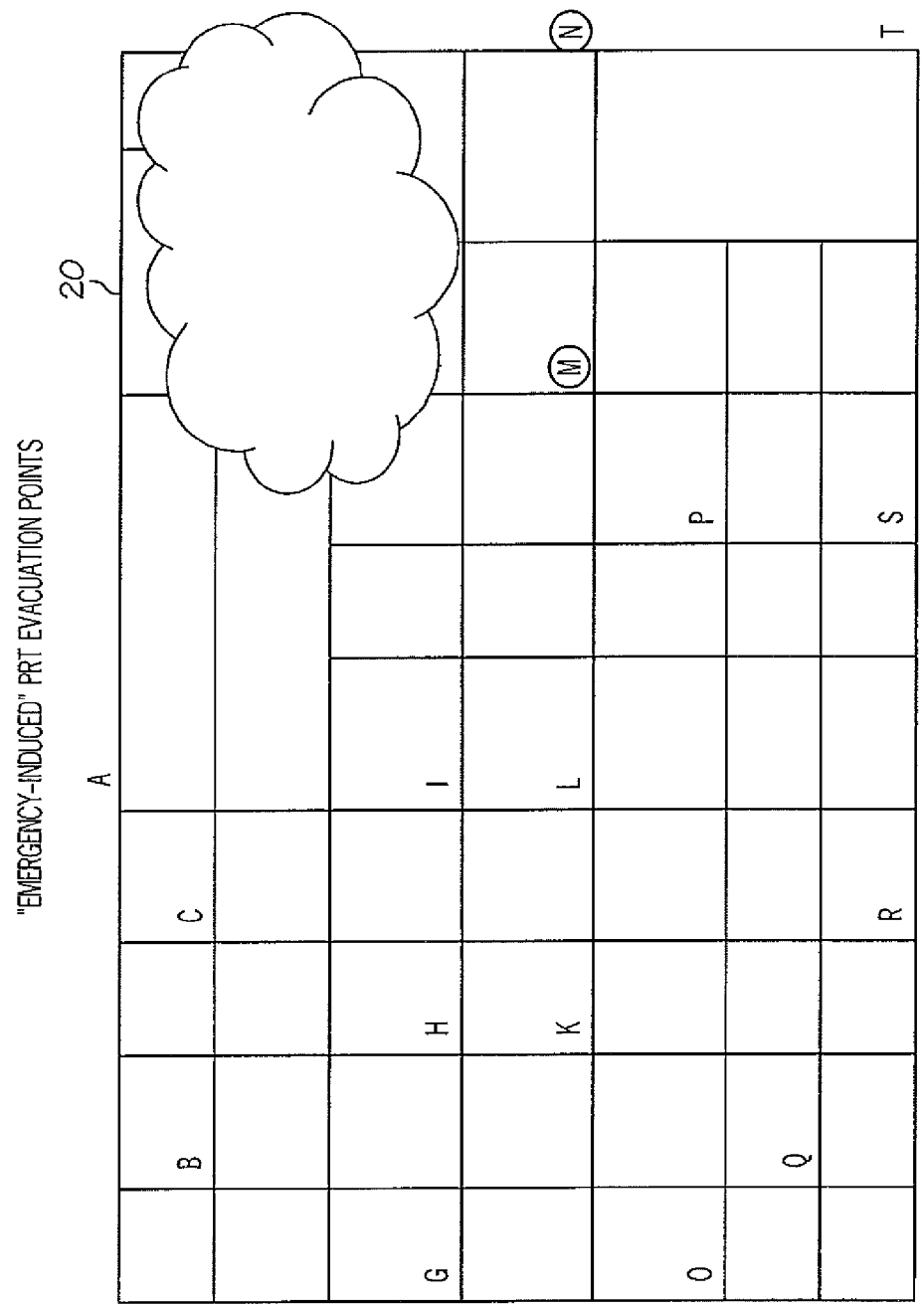
FIG. 3 shows another illustrative evacuation point map according to an embodiment of the present invention.

(2) A disaster is declared, and certain evacuation points are now unavailable for any number of reasons (e.g., fire or flooding outside the exit point). In the example shown in FIG. 3, points D, E, F, and J of map 20 have become unavailable.

(3) Optionally, other evacuation points may be declared "degraded". By degraded, certain rules may be put into place such as:

(3a) no PRTs to be directed toward these points, EXCEPT those in the declared emergency area (designated by red);

(3b) off-loading capacity of points has been reduced, and routing algorithms should adjust accordingly;

(3c) points only to be used as overflow, should other points be unable to handle necessary evacuation within prescribed time limits;

(3d) points expected to be taken "off-line" within some time period, or any other such recognition of dynamic circumstances.

(4) The relative outflow capacity of points is compared against system evacuation needs. Many PRT units may have been navigating through the system toward "distant" destinations, but which now must be relocated to the most advantageous evacuation point. This step makes a determination of where cars are located at a given instant of time, and determines the appropriate evacuation point for each. Note that the closest evacuation point may not be the most expedient. For instance, if points P and S have the same outflow processing capacity, and eight cars are closest to P but only one car is closest to S, the most advantageous out-processing is achieved by spreading the evacuations between the points.

(5) Rerouting is accomplished for each PRT unit in the system. The cars are rerouted from their original destinations, and now sent to the determined evacuation point.

(6) (Optional) Dynamic rerouting for evacuation may optionally be executed. In some cases, rerouting after an initial evacuation plan may be appropriate. For example, several cars may be routed for point P, and several for point S. However, delays at point P, or the possibility of point P soon becoming degraded, may result in dynamic rerouting of cars queued for P to subsequently be sent to S.

II. Computerized Implementation

Figure 4:
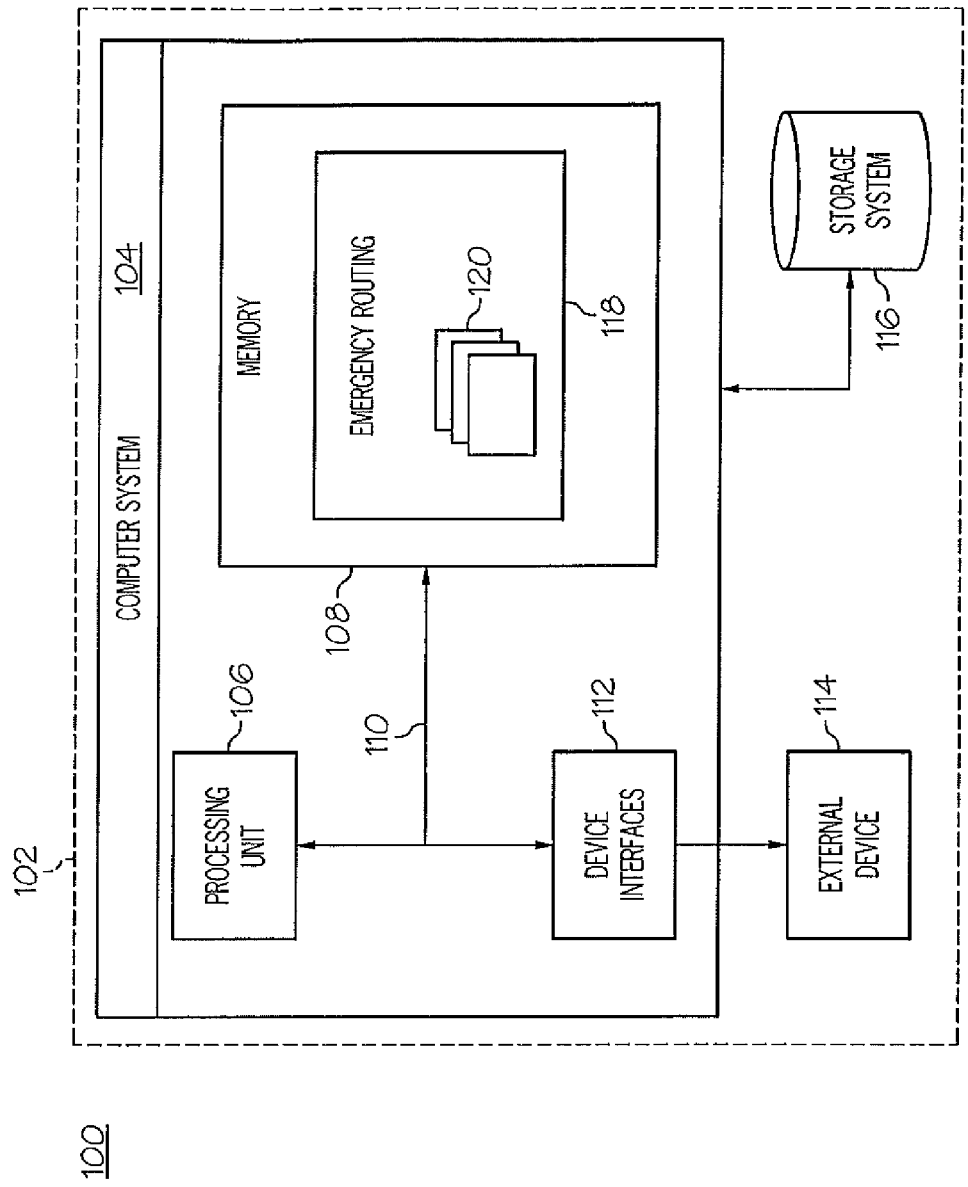
FIG. 4 shows a more specific computerized implementation according to an embodiment of the present invention.

Referring now to FIG. 4, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system 116 that communicate with bus 110 via device interfaces 112. In general, processing unit 106 executes computer program code, such as class prioritization software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 4 can be included in computer system 104.

Storage system 116 can be any type of system capable of providing storage for information under the present invention such as item appearances. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, etc.

Figure 5:
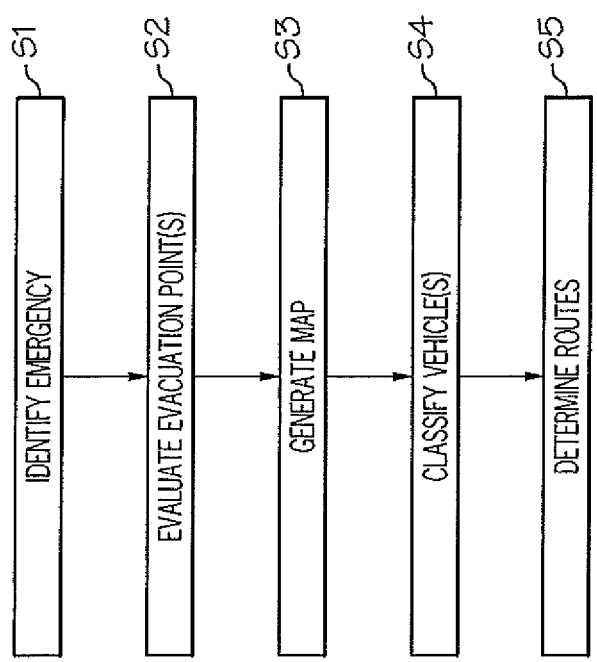
FIG. 5 shows a method flow diagram according to an embodiment of the present invention.

Shown in memory 108 of computer system 104 is emergency routing program 118 having a set (at least one) of modules 120. The modules 120 generally provide the functions of the present invention as described herein. These functions will be highlighted in conjunction with FIGS. 4 and 5 collectively. Specifically (among other things), set of modules 120 is configured to: identify an emergency affecting the controllable transit system (step S1); evaluate a set of evacuation points within the controllable transit system based on the emergency (step S2); generate a map that identifies the set of evacuation points (step S3); classify a set of vehicles of the controllable transit system as impacted or not impacted by the emergency (step S4); and determine a set of routes for the vehicles to reach the set of evacuation points, the set of routes being determined based on the evaluating and the classifying (step S5).

While shown and described herein as an emergency routing solution, it is understood that the invention further provides various alternative embodiments. For example, in one embodiment, the invention provides a computer readable/useable medium that includes computer program code to enable a computer infrastructure to provide an emergency routing solution. To this extent, the computer readable/useable medium includes program code that implements each of the various processes of the invention. It is understood that the terms computer readable medium or computer useable medium comprise one or more of any type of physical embodiment of the program code. In particular, the computer readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In another embodiment, the invention provides a method that performs the process of the invention on a subscription, advertising, and/or fee basis. That is, a service provider, such as a Solution Integrator, could offer to provide an emergency routing solution. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for emergency routing within a controllable transit system such as a PRT. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 4), from a computer readable medium; adding one or more computing devices to the computer infrastructure; and incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for emergency routing within a controllable transit system, comprising:
   mapping, by at least one computing device, a controllable transit system having a set of evacuation points;
   determining, by the at least one computing device, outflow capacity at the set of evacuation points;
   adjusting, by the at least one computing device, the mapping in response to an emergency; and
   optimizing, by the at least one computing device, the assignment of a set of vehicles of the controllable transit system to the set of evacuation points based on the determined outflow capacities and adjusted mapping, the optimizing comprising:
      evaluating, by the at least one computing device, the services and capabilities of at least one of the set of evacuation points, determining, by the at least one computing device, the optimum number of passengers in one of the set of vehicles based on the vehicle's maximum capacity and capability to pick up passengers, weighing, by the at least one computing device, for the one of the set of vehicles, time to pick up additional passengers against evacuation time based on the determining the optimum number of passengers, and assigning, by the at least one computing device, one of the set of evacuation points to the one of the set of vehicles based on the evaluating and weighing.

2. The method of claim 1, the adjusting the mapping further comprising:

identifying, by the at least one computing device, sections of the controllable transit system affected by the emergency;

determining, by the at least one computing device, the status of each of the set of evacuation points; and dynamically adjusting, by the at least one computing device, the mapping in response to the emergency.

3. The method of claim 2, the status being one of affected, unaffected, and degraded.

4. The method of claim 1, the optimizing the assignment of the set of vehicles of the controllable transit system to the set of evacuation points further comprising:

classifying, by the at least one computing device, each of the set of vehicles as impacted or not impacted; and determining, by the at least one computing device, a routing path for each of the set of vehicles based on the classifying.

5. The method of claim 4, where not impacted vehicles further comprise the classifications of emergency vehicles and sensor vehicles, and the determining a routing path is based on emergency vehicle routing.

6. A system for emergency routing within a controllable transit system, comprising:

a memory medium comprising instructions;

a bus coupled to the memory medium;

a processor coupled to the bus that when executing the instructions causes the system to:

map a controllable transit system having a set of evacuation points;

determine outflow capacity at the set of evacuation points;

adjust the mapping in response to an emergency; and optimize the assignment of a set of vehicles of the controllable transit system to the set of evacuation points based on the determined outflow capacities and adjusted mapping, the optimizing comprising:

evaluating the services and capabilities of at least one of the set of evacuation points, determining the optimum number of passengers in one of the set of vehicles based on the vehicle's maximum capacity and capability to pick up passengers, weighing, for the one of the set of vehicles, time to pick up additional Passengers against evacuation time based on the determination of the optimum number of passengers, and assigning one of the set of evacuation points to the one of the set of vehicles based on the evaluation and weighing.

7. The system of claim 6, the system further being caused to:

identify sections of the controllable transit system affected by the emergency;

determine the status of each of the set of evacuation points; and dynamically adjust the map in response to the emergency.

8. The system of claim 7, the status being one of affected, unaffected, and degraded.

9. The system of claim 6, the system further being caused to:

classify each of the set of vehicles as impacted or not impacted; and determine a routing path for each of the set of vehicles based on the classification.

10. The system of claim 9, where not impacted vehicles further comprise the classifications of emergency vehicles and sensor vehicles, and the routing path determination is based on emergency vehicle routing.

11. A computer readable storage device containing a program product for emergency routing within a controllable transit system, the computer readable storage device comprising program code for causing a computer to:

map a controllable transit system having a set of evacuation points;

determine outflow capacity at the set of evacuation points;

adjust the mapping in response to an emergency; and optimize the assignment of a set of vehicles of the controllable transit system to the set of evacuation points based on the determined outflow capacities and adjusted mapping, the optimizing comprising:

evaluating the services and capabilities of at least one of the set of evacuation points, determining the optimum number of passengers in one of the set of vehicles based on the vehicle's maximum capacity and capability to pick up passengers, weighing, for the one of the set of vehicles, time to pick up additional Passengers against evacuation time based on the determination of the optimum number of Passengers, and assigning one of the set of evacuation points to the one of the set of vehicles based on the evaluation and weighing.

12. The computer readable medium containing the program product of claim 11, the computer readable storage device further comprising program code for causing the computer to:

identify sections of the controllable transit system affected by the emergency;

determine the status of each of the set of evacuation points; and dynamically adjust the mapping in response to the emergency.

13. The computer readable storage device containing the program product of claim 12, the status being one of affected, unaffected, and degraded.

14. The computer readable storage device containing the program product of claim 11, the computer readable medium further comprising program code for causing the computer to:

classify each of the set of vehicles as impacted or not impacted; and determine a routing path for each of the set of vehicles based on the classification.

15. The computer readable storage device containing the program product of claim 14, where not impacted vehicles further comprise the classifications of emergency vehicles and sensor vehicles, and the routing path determination is based on emergency vehicle routing.

16. A method for deploying a system for emergency routing within a controllable transit system, comprising:

mapping, via a computer infrastructure, a controllable transit system having a set of evacuation points;

determining, via the computer infrastructure, outflow capacity at the set of evacuation points;

adjusting, via the computer infrastructure, the mapping in response to an emergency; and optimizing, via the computer infrastructure, the assignment of a set of vehicles of the controllable transit system to the set of evacuation points based on the determined outflow capacities and adjusted mapping, the optimizing comprising:

evaluating, via the computer infrastructure, the services and capabilities of at least one of the set of evacuation points;

determining, via the computer infrastructure, the optimum number of Passengers in one of the set of vehicles based on the vehicle's maximum capacity and capability to pick up passengers;

weighing, via the computer infrastructure, for the one of the set of vehicles, time to pick up additional Passengers against evacuation time based on the determination of the optimum number of passengers; and assigning, via a computer infrastructure, one of the set of evacuation points to the one of the set of vehicles based on the evaluation and weighing.

17. The method of claim 16, further comprising:

identifying, via the computer infrastructure, sections of the controllable transit system affected by the emergency;

determining, via the computer infrastructure, the status of each of the set of evacuation points; and dynamically adjusting, via the computer infrastructure, the map in response to the emergency.

\* \* \* \* \*